(12) United States Patent
Ohnishi

(10) Patent No.: US 8,184,968 B2
(45) Date of Patent: *May 22, 2012

(54) IMAGING APPARATUS

(75) Inventor: Naoyuki Ohnishi, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/710,621

(22) Filed: Feb. 23, 2010

(65) Prior Publication Data

US 2010/0232776 A1    Sep. 16, 2010

(30) Foreign Application Priority Data

Mar. 11, 2009    (JP) ................... 2009-057579

(51) Int. Cl.
G03B 3/00 (2006.01)
G03B 17/00 (2006.01)
G03B 7/099 (2006.01)

(52) U.S. Cl. .......................... 396/104; 396/79; 396/113

(58) Field of Classification Search .................... 396/79, 396/104, 113
See application file for complete search history.

(56) References Cited

U.S. PATENT DOCUMENTS

| | | | |
|---|---|---|---|
| 2007/0206940 A1* | 9/2007 | Kusaka | 396/128 |
| 2007/0252074 A1 | 11/2007 | Ng et al. | |
| 2008/0302947 A1 | 12/2008 | Utagawa | |
| 2009/0140131 A1 | 6/2009 | Utagawa | |
| 2010/0215354 A1* | 8/2010 | Ohnishi | 396/113 |

FOREIGN PATENT DOCUMENTS

| | | |
|---|---|---|
| JP | A-2-300730 | 12/1990 |
| JP | A-7-318785 | 12/1995 |
| JP | A-2007-4471 | 1/2007 |
| JP | A-2008-256826 | 10/2008 |
| JP | A-2008-304808 | 12/2008 |

* cited by examiner

*Primary Examiner* — Rodney Fuller

(74) *Attorney, Agent, or Firm* — Oliff & Berridge, PLC

(57) ABSTRACT

An imaging apparatus having a light receiving element having a micro lens array provided with a plurality of micro lenses, and a plurality of photoelectric conversion elements, and outputting a light receiving signal obtained by receiving a light beam from an optical system via the micro lens array; a detector that detects shift amounts of image plane by the optical system respectively for a plurality of focus detecting positions set at a plurality of positions in the image plane by the optical system; and a controller that determines a focus adjusting position for the optical system based on a plurality of the shift amounts detected respectively for the plurality of focus detecting positions and a range of the image plane where an image based on the light receiving signal is enabled to be produced, and obtains the light receiving signal at the focus adjusting position with the light receiving element.

20 Claims, 13 Drawing Sheets

IMAGING APPARATUS

BACKGROUND OF THE INVENTION

1. Field of the Invention

The present invention relates to an imaging apparatus.

2. Description of the Related Art

An application by the present assignee as for an image synthesis method has been filed (refer to Japanese Unexamined Patent Publication No. 2007-4471, for example). The method allows a photographer after shooting to obtain a synthesized image in focus for a subject at an arbitrary distance based on a data obtained by one time shooting.

SUMMARY OF THE INVENTION

The above image synthesis method proposes no particular technique to designate as many subjects as possible to be image-synthesized in focuses based on a signal obtained through one time shooting when a plurality of subjects with deferent distances are present within a shooting range.

The object of the present invention is to provide an imaging apparatus which enables to designate as many subjects as possible to be image-synthesized in focuses based on a signal obtained through one time shooting when a plurality of subjects with deferent distances are present within a shooting range.

The above object is achieved by the following aspects of the present invention. Although an aspect of the present invention will be described herein with reference to reference numerals to be used in figures for the embodiments according to the present invention, these reference numerals are used herein in order for the present invention to be easily understood and they are not intended to limit the invention.

The present invention is an imaging apparatus comprising:

a light receiving element having a micro lens array provided with a plurality of micro lenses (111a) arranged two-dimensionally, and a plurality of photoelectric conversion elements (112a) provided for the plurality of micro lenses, and outputting a light receiving signal obtained by receiving a light beam from an optical system via the micro lens array;

a detector (152) that detects shift amounts of image plane by the optical system respectively for a plurality of focus detecting positions set at a plurality of positions in the image plane by the optical system; and a controller (153 and 160) that determines a focus adjusting position for the optical system based on a plurality of the shift amounts detected respectively for the plurality of focus detecting positions and a range of the image plane where an image based on the light receiving signal is enabled to be produced, and obtains the light receiving signal at the focus adjusting position with the light receiving element.

In the Image apparatus according to the present invention, the controller (153 and 160) determines the focus adjusting position such that the range of the image plane where the image is enabled to be produced includes the shift amounts.

In the Image apparatus according to the present invention, the range of the image plane where the image is enabled to be produced is determined based on each effective diameter of the micro lenses (111a) and each size of the photoelectric conversion elements (112a).

In the Image apparatus according to the present invention, the controller (153 and 160) determines the focus adjusting position after removing a part of a distribution of the shift amounts.

In the Image apparatus according to the present invention, the controller (153 and 160) determines the focus adjusting position after removing a certain shift amount with low reliability out of the shift amounts.

The imaging apparatus according to the present invention may further includes a recognition device (160) that recognizes an image of a specific subject from an image by the optical system, wherein the controller (153 and 160) determines the focus adjusting position based on the shift amount detected for a focus detecting position corresponding to the image recognized by the recognition device out of the plurality of the focus detecting positions.

The imaging apparatus according to the present invention may further includes a synthesizer (160) that synthesizes an image at a specific image plane by the optical system based on the light receiving signal.

The imaging apparatus according to the present invention may further includes a memory (170) that memorizes the shift amounts together with the light receiving signal relevant thereto.

In the Image apparatus according to the present invention, the detector (152) detects the shift amounts of the image plane by the optical system based on the light receiving signal.

The present invention is an image synthesis method comprising:

detecting shift amounts of image plane by an optical system for each of a plurality of focus detecting positions set at a plurality of positions in the image plane by the optical system;

determining a focus adjusting position for the optical system based on a plurality of the shift amounts detected respectively for the plurality of focus detecting positions and a range of the image plane where an image based on a light receiving signal is enabled to be produced;

generating a light receiving signal by receiving a light beam from the optical system at the focus adjusting position with a plurality of photoelectric conversion elements which is provided for a micro lens array having a plurality of micro lenses arranged two-dimensionally, the light beam passing through the micro lens array; and synthesizing an image at a specific image plane by the optical system based on the light receiving signal.

According to the present invention, it is enabled to designate as many subjects as possible to be image-synthesized in focuses based on a signal obtained through one time shooting when a plurality of subjects with deferent distances are present within a shooting range.

DESCRIPTION OF THE PREFERRED EMBODIMENTS

Figure 1:
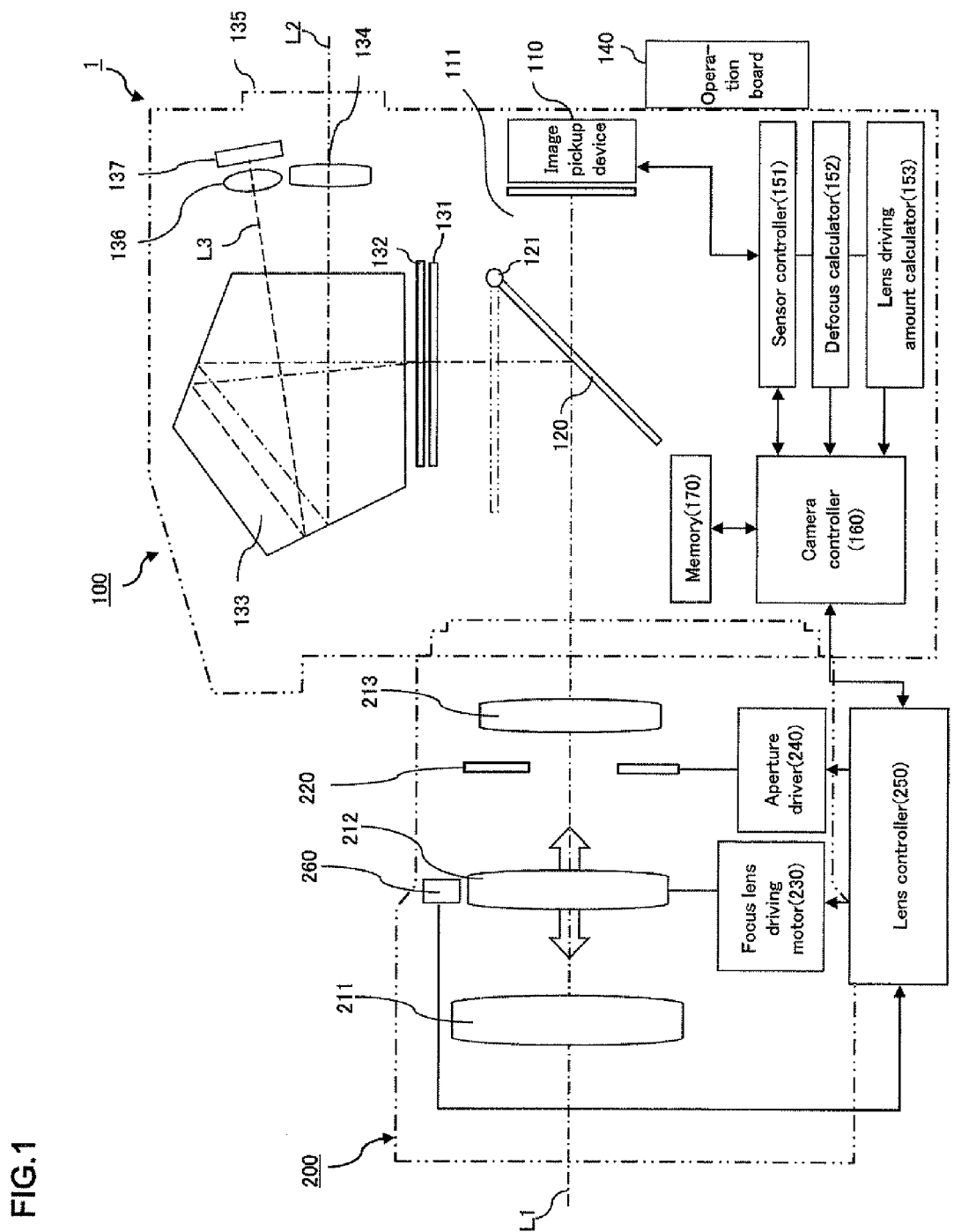
FIG. 1 is a block diagram illustrating a single-lens reflex digital camera 1 according to the present embodiment.

Hereinafter, embodiments according to the present invention will be described with reference to the drawings. FIG. 1 is a block diagram illustrating a single-lens reflex digital camera 1 according to the present embodiment, and illustration and description as for a general structure of a camera are omitted except for the structure relevant to the imaging apparatus according to the present invention.

The single-lens reflex digital camera 1 (hereinafter referred to as simply "camera 1") according to the present embodiment has a camera body 100 and a lens barrel 200, and the camera body 100 and the lens barrel 200 are detachably jointed to each other by means of a mount mechanism.

The lens barrel 200 is provided therein with a shooting optical system including lenses 211, 212, and 213 and an aperture 220.

The focus lens 212 is provided movably along an optical axis L1 of the lens barrel 200, and the position thereof is adjusted by a focus lens driving motor 230 while the position is detected by an encoder 260.

Specific structure of a moving mechanism for the focus lens 212 along the optical axis L1 is not particularly limited. For example, a rotatable barrel forming a helicoidal groove (screw-shaped groove) on the inner surface thereof is rotatably inserted into a fixed barrel fixed to the lens barrel 200, a lens frame having a side projection is provided to hold the focus lens 212, and the side projection of the lens frame is engaged in the helicoidal groove. By using the focus lens driving motor 230 and rotating the rotatable barrel, the focus lens 212 held by the lens frame moves on a straight line along the optical axis L1. it is to be noted that, although the lenses 211 and 213 are provided in the lens barrel 200 in addition to the focus lens 212, the present embodiment will be described with reference to the focus lens 212 hereinafter.

As described above, the focus lens 212 held by the lens frame moves on a straight line along the optical axis L1 by rotating the rotatable barrel to the lens barrel 200. As a driving source thereof, the focus lens driving motor 230 is provided in the lens barrel 200. The focus lens driving motor 230 and the rotatable barrel are connected mechanically to each other through a transmission configured to have a plurality of gears. When the drive shaft of the focus lens driving motor 230 is driven to rotate in either one direction, the driving force is transmitted by a predetermined gear ratio to drive the rotatable barrel in a certain direction, thereby moving the focus lens 212 held by the lens frame straight ahead along the optical axis L1 in a certain direction. Contrary to this, when the drive shaft of the focus lens driving motor 230 is driven to rotate in the opposite direction, gears of the transmission also rotate in opposite directions, and the focus lens 212 moves straight ahead along the optical axis L1 in the reverse direction.

The position of the focus lens 212 is detected by the encoder 260. As described above, the position of the focus lens 212 in the direction of the optical axis L1 is correlative to the rotating angle of the rotatable barrel. Therefore, the position of the focus lens 212 can be determined by detecting a relative rotating angle of the rotatable barrel to the lens barrel 200, for example.

As the encoder 260 according to the present embodiment, various kinds of encoders may be used. For example, an optical sensor such as a photo interrupter detecting rotation of a rotating disk interlocked to the rotatable barrel rotatably and outputting a pulse signal in accordance with the rotation of the disk may be used. Or an encoder having an encoder pattern and a brush contact to contact with the encoder pattern may be used. The encoder pattern is provided with a flexible wiring board on either one of the fixed barrel or the rotatable barrel, and the brush contact is provided on the other. In this encoder, the change in a contacting position is detected by a detecting circuit depending on a driving amount of the rotatable barrel (Either the rotating direction or the direction of the optical axis may be employed).

The focus lens 212 is movable in the direction of the optical axis L1 within a range from an end position at the side of the camera body 110 (also referred to as the near end) to an end position at the side of a subject (also referred to as the infinite end) by rotating the above-mentioned rotatable barrel. Herein, the encoder 260 detects the present position of the focus lens 212, and information relevant to the present position is transmitted via a lens controller 250 to a camera controller 160 to be described later. A driving amount for the focus lens 212 calculated based on the received information is transmitted to the focus lens driving motor 230 via the lens controller 250, and the focus lens driving motor 230 is driven based on the received driving amount.

The aperture 220 is configured to have an adjustable aperture size centering around the optical axis L1 so as to limit an amount of light beam passing through the above-mentioned shooting optical system and reaching an image pickup device 110 provided within the camera body 100 and to adjust a blur amount. The adjustment for the aperture size of the aperture 220 is accomplished by obtaining a signal in accordance with an appropriate aperture size calculated in an automatic exposure mode, for example, and transmitting the obtained signal from the camera controller 160 via the lens controller 250. Alternatively, the aperture size may be set by manual operation at an operation board 140 provided on the camera body 100, and in this case the set aperture size is input from the camera controller 160 to the lens controller 250. The aperture size of the aperture 220 is detected by an aperture size detector not shown, and the present aperture size is recognized by the lens controller 250.

Meanwhile, the camera body 100 is provided therein with a quick return mirror 120 in order that the quick return mirror 120 guides the light beam from a subject to the image pickup device 110, a view finder 135, and a photometric sensor 137. The quick return mirror 120 moves pivotally around a pivot axis 121 within a certain angular range between an observing position to a subject and a shooting position to the subject. FIG. 1 illustrates two statuses of the quick return mirror 120, one for the observing position to the subject indicated by solid lines and the other for the shooting position to the subject indicated by two-dot chain lines. The quick return mirror 120 moves pivotally between the two statuses, that is, in the observing position to the subject, the quick return mirror 120 is positioned on an optical path of the optical axis L1, whereas in the shooting position to the subject, the quick return mirror 120 escapes from the optical path of the optical axis L1.

The quick return mirror 120 is configured as a half mirror to reflect and guide certain optical beams (optical axes L2 and L3) extracted from the optical beam (optical axis L1) from the subject respectively to the view finder 135 and the photometric sensor 137, and to transmit and guide the residual optical beam to the image pickup device 110, in the status of the observing position to the subject.

Accordingly, when the quick return mirror 120 is positioned at the observing position, the optical beam (optical axis L1) from the subject is guided to the view finder 135, the photometric sensor 137 and the image pickup device 110, then the subject is observed by a photographer, and a calculation of exposure and a detection for a focusing adjustment status of the focus lens 212 are performed. Herein, full pressing by the photographer of a shutter release button (not shown) provided at the operation board 140 allows the quick return mirror 120 to move pivotally to the shooting position, then the optical beam (optical axis L1) from the subject is fully guided to the image pickup device 110, and the shooting of the subject is performed.

The optical beam from the subject reflected by the quick return mirror 120 forms an image on a focal plane plate 131 arranged at a plane equivalent optically to the image pickup device 110, and then the optical beam is guided into an ocular globe of the photographer via a pentagonal prism 133 and an ocular lens 134. At this time, a transmissive type liquid crystal display device 132 displays a focus detecting area mark or the like by superimposing onto an image of the subject formed on the focal plane plate 131, and displays information pieces relevant to the shooting, such as a shutter speed, an aperture value, and the number of shootings, at an outer area not overlapping the image of the subject. This allows the photographer to observe both the subject and the back-ground thereof, and the information relevant to the shooting and the like, through the view finder 135 in a shooting standby status.

The photometric sensor 137 is configured by using a two-dimensional color CCD image sensor or the like. The photometric sensor 137 is assigned with a plurality of areas obtained by dividing a shooting screen, and outputs a photometric signal in accordance with the luminance of each area in order for an exposure value to be calculated at the time of shooting. Image information detected in the photometric sensor 137 is output to the camera controller 160 and is utilized for an automatic exposure control.

Figure 2:
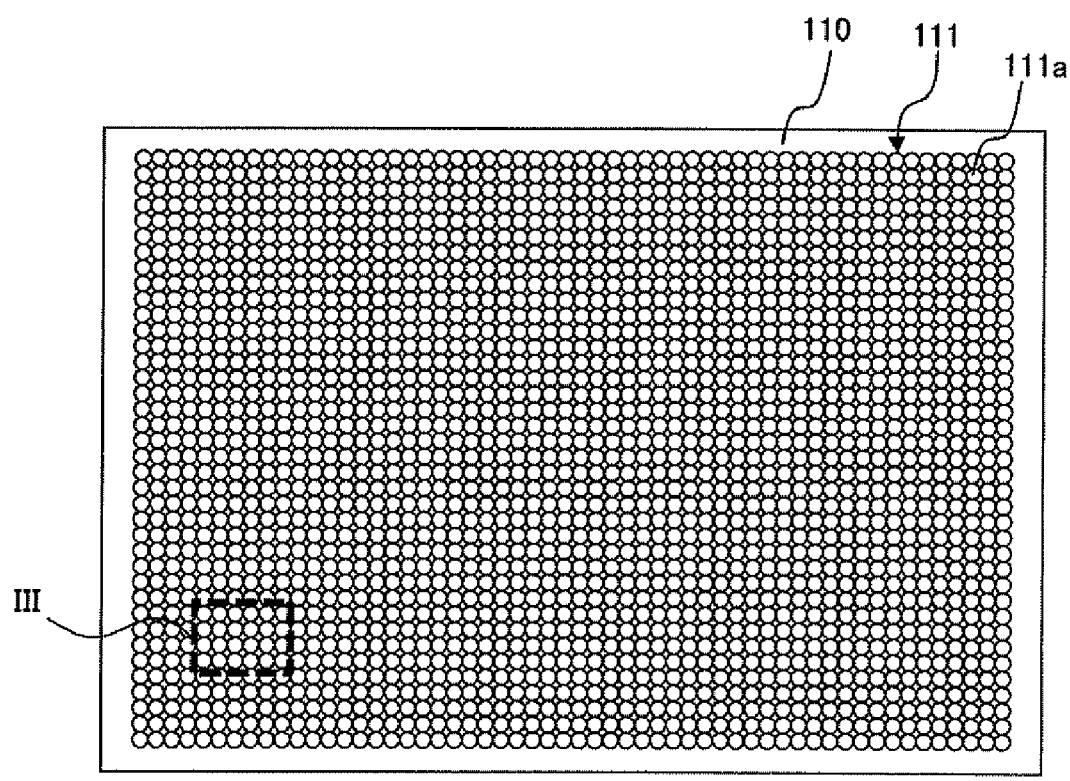
FIG. 2 is a plan view illustrating an image pickup device 110 provided with a micro lens array 111 shown in FIG. 1.

The image pickup device 110 is provided on the optical axis L1 of the light beam from a subject and in the camera body 100. In addition, a micro lens array 111 is placed at the front of the image pickup device 110, and such a configuration is obtained that photoelectric conversion elements of the image pickup device 110 receives light passing through the micro lens array 111. It is to be noted that the micro lens array 111 is located just on or in the vicinity of a position to be a possible focusing plane of the shooting optical system. Herein, FIG. 2 is a plan view illustrating the image pickup device 110 provided with the micro lens array 111 shown in FIG. 1, and the plan view is a view seen from the micro lens array 111 side. As shown in FIG. 2, the micro lens array 111 has a plurality of micro lenses 111a densely arranged in a two-dimensional plane.

Figure 3:
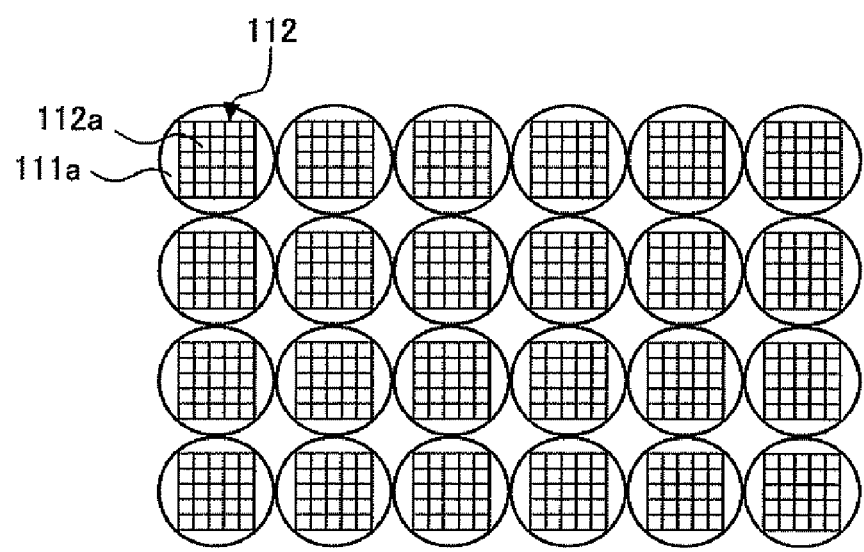
FIG. 3 is an enlarged view of the area designated by reference Roman numeral III in FIG. 2.

FIG. 3 is an enlarged view of the area designated by reference Roman numeral III in FIG. 2. As shown in FIG. 3, the image pickup device 110 has a plurality of photoelectric conversion element array 112 configured with a plurality of photoelectric conversion elements 112a for each micro lens 111a. Light passing through each micro lens 111a is received by the plurality of the photoelectric conversion elements 112a forming each photoelectric conversion element array 112 allocated to the relevant micro lens 111a. Although FIG. 3 illustrates the photoelectric conversion elements 112a of the photoelectric conversion element array 112 corresponding to each micro lens 111a such that each number (depending on pixel density) of the elements 112a in the vertical direction and the horizontal direction is five, these numbers are not particularly limited. A light receiving signal obtained by receiving light on each photoelectric conversion element 112a forming the photoelectric conversion element array 112 is transmitted to a sensor controller 151. More specifically, light receiving signals transmitted from the image pickup device 110 to the sensor controller 151 are further transmitted to the camera controller 160, and are stored in a memory 170 after being converted into an image data, and on the other hand used for a defocus calculation by a defocus calculator 152 when the quick return mirror 120 is located at the observing position.

The sensor controller 151 controls the light receiving by each photoelectric conversion element 112a forming the photoelectric conversion element array 112 of the image pickup device 110, and further controls a gain, a storage time, and the like such that the light receiving signal to be obtained by each photoelectric conversion element 112a becomes to be appropriate. The sensor controller 151 also receives the signal from the image pickup device 110 and transmits the signal to be received to the camera controller 160 and the defocus calculator 152.

Figure 4:
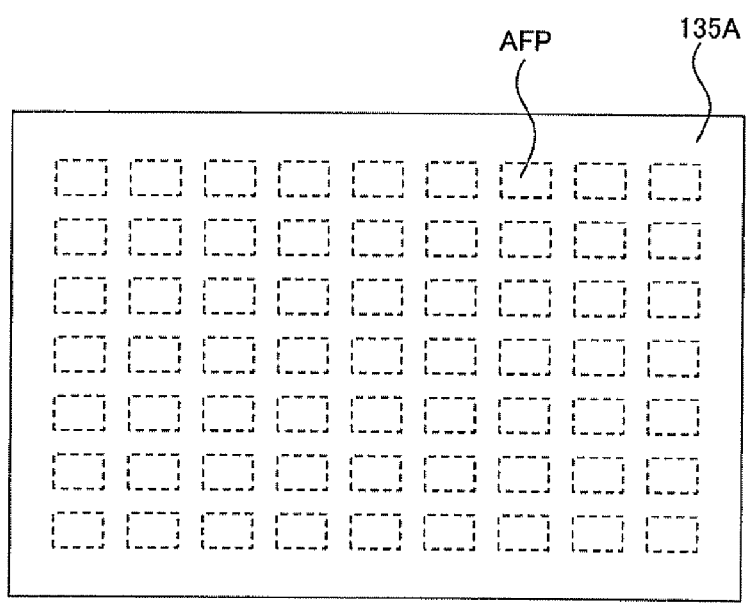
FIG. 4 is a view illustrating a shooting screen 135A including focus detecting areas AFP to be observed through a view finder 135.

The defocus calculator 152 receives the signal from the sensor controller 151 and determines, based on the signal to be received, which micro lenses 111a are allocated to a certain area corresponding to each focus detecting area (or auto focus point) AFP shown in FIG. 4, and reads out the output of each photoelectric conversion element 112a relevant to the determined micro lenses 111a as a signal for focus detecting. Herein, FIG. 4 is a view illustrating a shooting screen 135A to be observed through the view finder 135. In the present embodiment, the shooting screen 135A includes a plurality of focus detecting areas AFP and the number thereof is 63 as shown in FIG. 4.

As described above, the micro lens array 111 (each micro lens 111a) is located just on or in the vicinity of a position to be a possible focal plane of the shooting optical system. Therefore, a pupil image of the shooting optical system is image-formed by each micro lens 111a on the photoelectric conversion element array 112 (each photoelectric conversion element 112a) located behind the micro lens array 111 (each micro lens 111a). Because each photoelectric conversion element 112a forming the photoelectric conversion element array 112 corresponds to each part of the pupil, if the photoelectric conversion elements 112a are selected for each micro lens 111a and signals therefrom are combined, it is possible to obtain an image picked up at a certain aperture determined by the selected photoelectric conversion elements 112a. According to the present embodiment, the defocus calculator 152 combines outputs from the photoelectric conversion elements 112a each corresponding to each part of the pupil to obtain an image. The obtained image is utilized for a calculation of an image shift amount by using a pupil division phase difference detecting method. Thus, a defocus amount df at each of a plurality of positions respectively depending on the focus detecting areas AFP can be obtained. The defocus calculator 152 transmits the obtained defocus amount df to the camera controller 160.

A lens driving amount calculator 153 performs a calculation for a driving amount ΔW of the focus lens 212 based on a plurality of defocus amounts df, which are transmitted from the defocus calculator 152, at the plurality of positions each depending on each focus detecting area AFP. A calculating method for the driving amount ΔW of the focus lens 212 will be described later. The driving amount ΔW obtained in the lens driving amount calculator 153 is transmitted to the camera controller 160.

The operation board 140 is provided with the shutter release button and input switches for a photographer to set various operating modes of the camera 1, thereby enabling the photographer to select from AUTO FOCUS MODE/MANUAL FOCUS MODE. The shutter release button has switches including a first switch SW1 and a second switch SW2. The first switch SW1 is turned ON when the button is half-pressed, whereas the second switch SW2 is turned ON when the button is pressed fully. Information regarding the switches SW1 and SW2 of the shutter release button and various modes set by means of the operation board 140 is transmitted to the camera controller 160, and the camera controller 160 controls entire operation of the camera 1.

The camera body 100 is provided therein with the camera controller 160. The camera controller 160, which is configured with a microprocessor and peripheral parts such as memories, is electrically connected with the lens controller 250 via electrical signal contacts provided on the above-mentioned mount mechanism. The camera controller 160 receives lens information from the lens controller 250 and transmits information regarding an aperture control signal and the like to the lens controller 250.

The camera controller 160 also performs an image synthesis in accordance with the method to be hereinafter described thereby producing a synthetic image in focus for each of a plurality of subjects in a shooting screen, and stores the obtained synthetic image into the memory 170. The image synthesis is performed, after the photographer's selection using the operation board 140, based on the light receiving signal obtained by the image pickup device 110 and the defocus amount df at each of the plurality of positions respectively depending on the focus detecting areas AFP.

Alternatively, in the case that the photographer's selection is not to perform the image synthesis for the shot image, no image synthesis is performed and the camera controller 160 stores the light receiving signal obtained by the image pickup device 110 together with the data regarding the defocus amount df at each of the plurality of positions respectively depending on the focus detecting areas AFP into the memory 170.

Figure 5:
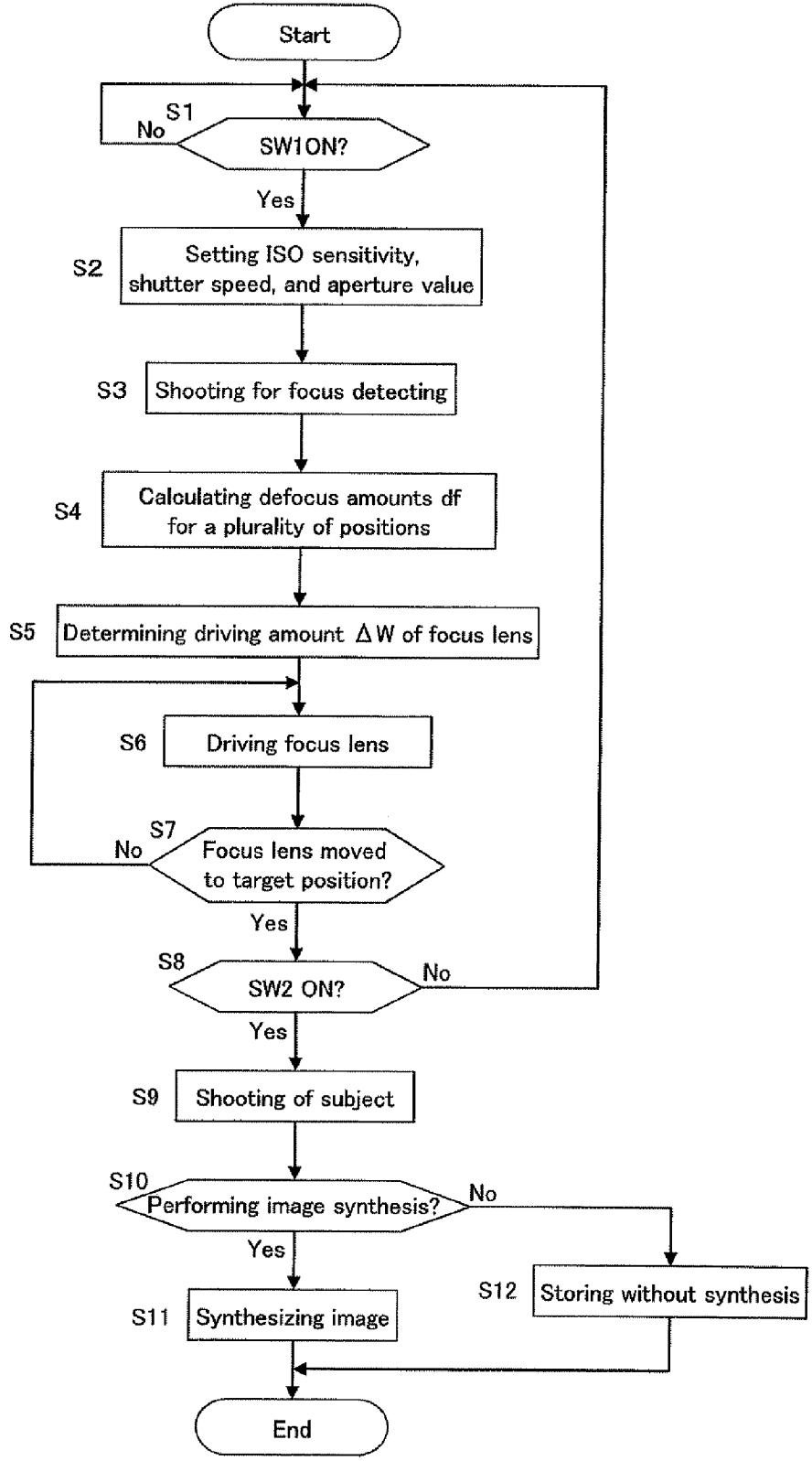
FIG. 5 is a flowchart illustrating an operation of the camera 1 according to the present embodiment.

Hereinafter, an operational example of the camera 1 according to the present embodiment will be described. FIG. 5 is a flowchart illustrating an operation of the camera 1 according to the present embodiment.

Firstly, in step S1, the camera controller 160 determines whether or not the shutter release button has been half-pressed (the first switch SW1 being turned ON) by a photographer. If the first switch SW1 has been turned ON, then the process proceeds to step S2, whereas if the switch SW1 has not been turned ON, then the process stands by at step S1.

After the shutter release button is half-pressed and the first switch SW1 is turned ON, the camera controller 160 sets, in step S2, an ISO sensitivity, a shutter speed, and an aperture value in order that an appropriate exposure is obtained. The ISO sensitivity, the shutter speed, and the aperture value are set based on the photometric signal output from the photometric sensor 137, for example. The set ISO sensitivity and the set shutter speed are transmitted to the sensor controller 151 and the set aperture value is transmitted to the lens controller 250, and they are used as a shooting condition at the time of shooting by the image pickup device 110 in step S9 to be described later. Alternatively, in the case that a user has preliminarily set the ISO sensitivity, the shutter speed, and the aperture value via the operation board 140, the preliminarily set values may be used.

In the following step S3, the image pickup device 110 performs light receiving, in accordance with the signal from the sensor controller 151, of a light beam from the shooting optical system, thereby performing a shooting for the focus detecting. Herein, the shooting for the focus detecting is performed in the condition where the quick return mirror 120 is located at the shooting position. Thus, a signal depending on each photoelectric conversion element 112a is transmitted from the image pickup device 110 to the sensor controller 151.

In the following step S4, the defocus calculator 152 obtains the signal depending on each photoelectric conversion element 112a from the sensor controller 151, and selects and reads out a signal for the focus detecting from the obtained signals. Based on this, the defocus calculator 152 performs a calculation of an image shift amount by the pupil division phase difference detecting method and calculates out a defocus amount df at each of the plurality of positions respectively depending on the focus detecting areas AFP shown in FIG. 4. The calculated defocus amount df at each of the plurality of positions respectively depending on the focus detecting areas AFP is transmitted to the camera controller 160.

In the following step S5, the lens driving amount calculator 153 performs a calculation for a driving amount ΔW of the focus lens 212 based on a distribution of the defocus amounts df respectively depending on the focus detecting areas AFP. Hereinafter, a specific method for calculating the driving amount ΔW of the focus lens 212 will be described.

At first, the lens driving amount calculator 153 determines a range (image synthesis range) of an image plane capable of being image-synthesized based on the light receiving signal obtained in the image pickup device 110. The light receiving signal used herein is a signal relevant to a position of the image plane for the lens position of the focus lens 212 at the time of shooting for the focus detecting performed in step S3.

Figure 6:
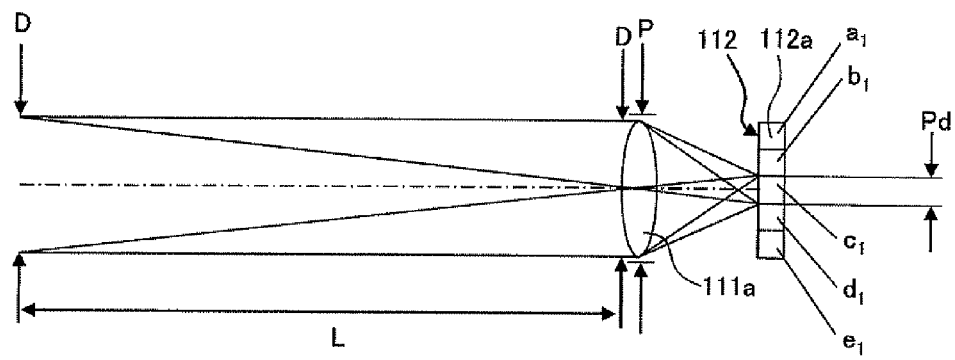
FIG. 6 is a view illustrating a light beam being incident to, via a micro lens 111a, a certain photoelectric conversion element $c_1$ out of photoelectric conversion elements 112a forming a photoelectric conversion element array 112.

Herein, the description will be directed as for the image synthesis range. FIG. 6 illustrates a light beam being incident, via the micro lens 111a, to a certain photoelectric conversion element $c_1$ out of the photoelectric conversion elements 112a forming the photoelectric conversion element array 112. It is to be noted that the photoelectric conversion elements 112a forming the photoelectric conversion element array 112 are designated by reference characters $a_1$, $b_1$, $c_1$, $d_1$, and $e_1$ in FIG. 6. In the imaging apparatus according to the present embodiment, an optical resolution of the obtained image corresponds to one micro lens as one unit of pixel. Therefore, a range of the image plane, within which images can be synthesized with a certain optical resolution, is determined by a distance L from the micro lens 111a to a position where the size of a inverted image of the photoelectric conversion element 112a is approximately equal to the effective diameter D of the micro lens 111a, as shown in FIG. 6. In other words, if light from an area with a size same as the effective diameter D (D<arrangement pitch P) of the micro lens 111a passes through the micro lens 111a and is incident to the single photoelectric conversion element $c_1$, there can be obtained an optical resolution corresponding to one micro lens as one unit of pixel. Accordingly, the distance L is intended to mean the image synthesis range. That is, the image synthesis range is determined depending on the effective diameter D of the micro lens 111a and the size of the photoelectric conversion element $c_1$.

The lens driving amount calculator 153 determines a lens position of the focus lens 212 based on not only the image synthesis range obtained in this manner but also the distribution of the defocus amounts df, calculated in the defocus calculator 152, at the plurality of positions respectively depending on the focus detecting areas AFP, and further determines the driving amount ΔW of the focus lens 212 based on the determined lens position.

Figure 7A:
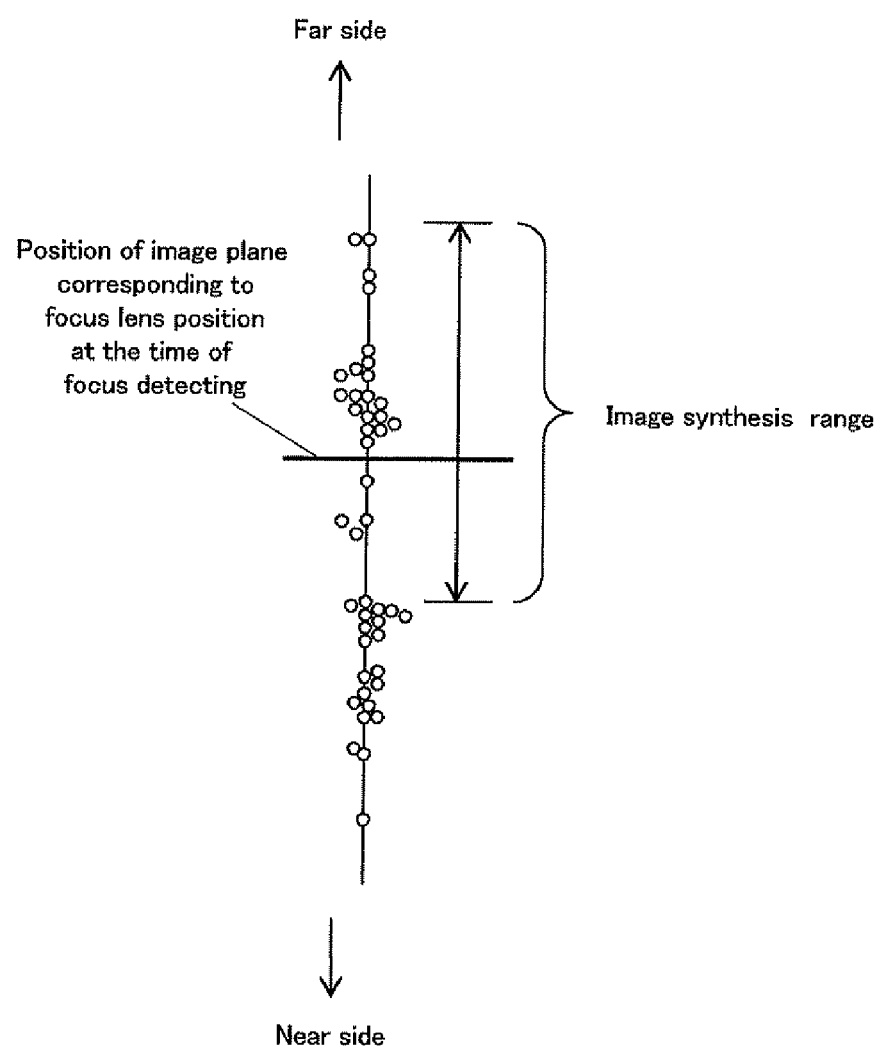
FIGS. 7A and 7B are views for explaining a method of determining a lens position of a focus lens 212 according to the present embodiment.
Figure 7B:
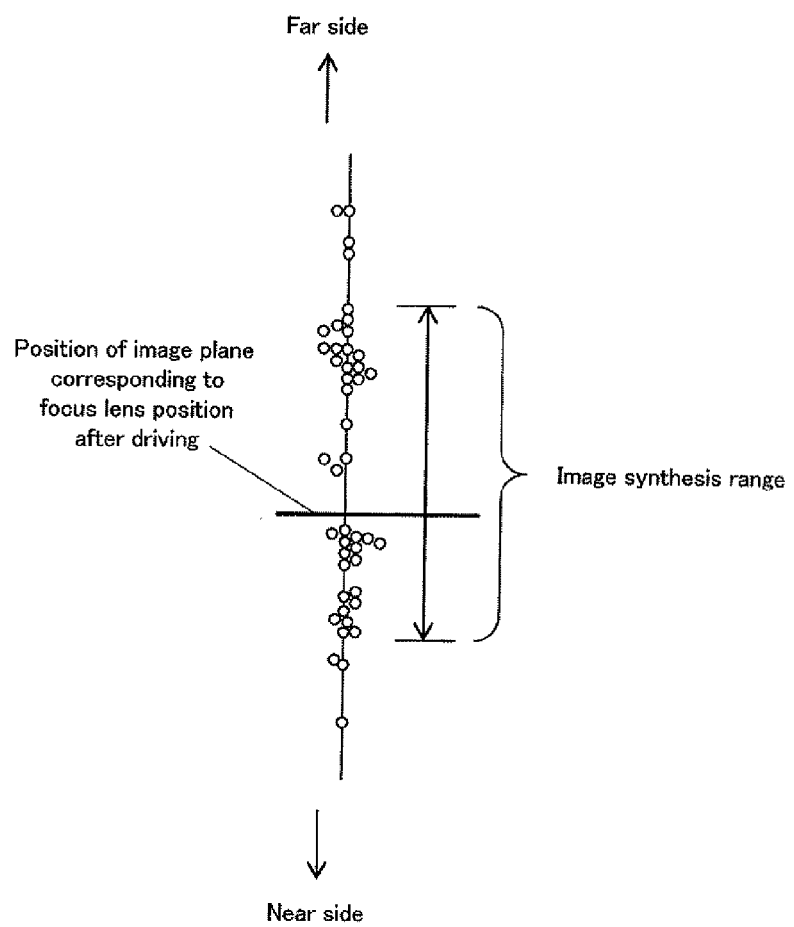

FIGS. 7A and 7B are views for explaining a method of determining a lens position of the focus lens 212 according to the present embodiment. More specifically, FIG. 7A is a view at the time of shooting for the focus detecting in step S3, and FIG. 7B is a view after the focus lens 212 is driven by the driving amount ΔW. Herein, positions of the image plane for each focus detecting area AFP are indicated by outline circles. That is, FIGS. 7A and 7B illustrate the cases that positions of the image plane in each focus detecting area AFP are distributed as shown statuses.

As shown in FIG. 7A, the lens driving amount calculator 153 firstly obtains the image synthesis range according to the above-described method at the position of the image plane corresponding to the lens position of the focus lens 212 at the time of shooting for the focus detecting in step S3. Next, the lens driving amount calculator 153 obtains a distribution of a plurality of positions of the image plane each corresponding to each focus detecting area AFP by using the distribution of the defocus amounts df at the plurality of positions respectively depending on the focus detecting areas AFP. Herein, the lens position of the focus lens 212 moves, and then the image synthesis range moves in accordance therewith (refer to FIGS. 7A and 7B, for example). Therefore, the lens driving amount calculator 153 obtains the lens position of the focus lens 212 such that the most positions of the image plane corresponding to each focus detecting area AFP are present within the above-obtained image synthesis range. FIG. 7B is a view after moving the focus lens 212 to the lens position obtained in this manner. As apparent from FIGS. 7A and 7B, by moving the focus lens 212 to the position shown in FIG. 7B, the image synthesis range becomes to include more positions of the image plane corresponding to each focus detecting area AFP compared to the positions shown in FIG. 7A. Then, the lens driving amount calculator 153 determines the driving amount ΔW required for moving the focus lens 212 from the present position to the obtained lens position, and transmits the determined driving amount ΔW to the camera controller 160.

It is preferred that, at the time of determining the lens position of the focus lens 212 in step S5 according to the present embodiment, after removing some defocus amounts df being estimated as not to be relevant to the subject from the defocus amounts df at the plurality of positions respectively depending on the focus detecting areas AFP, the lens position of the focus lens 212 is determined. Although not limited, such estimation may be performed by, for example, finding out a certain defocus amount df excluded from a large part of the distribution obtained based on the defocus amounts df at the plurality of positions, and determining the certain defocus amount df as not being relevant to the subject. Alternatively, some defocus amounts df with poor reliability may be determined as not being relevant to the subject after evaluating a reliability of each defocus amount df at the plurality of positions respectively depending on the focus detecting areas AFP.

In the following step S6, the camera controller 160 transmits the driving amount ΔW determined by the lens driving amount calculator 153 to the lens controller 250. Then, the lens controller 250 subjects the focus lens driving motor 230 to driving based on the determined driving amount ΔW, thereby the focus lens 212 moves.

In the following step S7, the lens controller 250 determines, based on the information as for the position of the focus lens 212 obtained from the encoder 260, whether or not the focus lens 212 has moved to a target position (the lens position determined in step S5) through being driven by the focus lens driving motor 230. If it is determined that the focus lens 212 has not moved to the target position, then the process returns to step S6, and the driving of the focus lens 212 is continued until the focus lens 212 moves to the target position. On the other hand, if it is determined that the focus lens 212 has moved to the target position, then the process proceeds to step S8.

In step S8, the camera controller 160 determines whether or not the shutter release button has been fully pressed (the second switch SW2 being turned ON) by the photographer. If the second switch SW2 has been turned ON, then the process proceeds to step S9, whereas if the second switch SW2 has not been turned ON, then the process returns to step S1 and repeats steps S2 to S8 provided that the shutter release button is half-pressed and the first switch SW1 maintains to be turned ON.

In step S9, the image pickup device 110 performs a shooting for the subject under the condition determined in step S2, and the signal depending on each photoelectric conversion element 112a is transmitted from the image pickup device 110 to the sensor controller 151. In addition, the camera controller 160 receives the signal from the image pickup device 110 via the sensor controller 151, and the signal to be received and the data of the defocus amount df for each focus detecting area AFP calculated in the defocus calculator 152 are transmitted and stored into the memory 170.

In the following step S10, it is determined whether or not, in accordance with the selection by the photographer using the operation board 140, to perform an image synthesis based on the light receiving signal obtained by the image pickup device 110 in step S9. It is to be noted that the process may be configured such that a photographer preliminarily sets before shooting whether or not to perform the image synthesis, or alternatively such that a photographer selects after shooting whether or not to perform the image synthesis. If it has been set by a photographer to perform the image synthesis, then the process proceeds to step S11, and otherwise the process proceeds to step S12.

Figure 8:
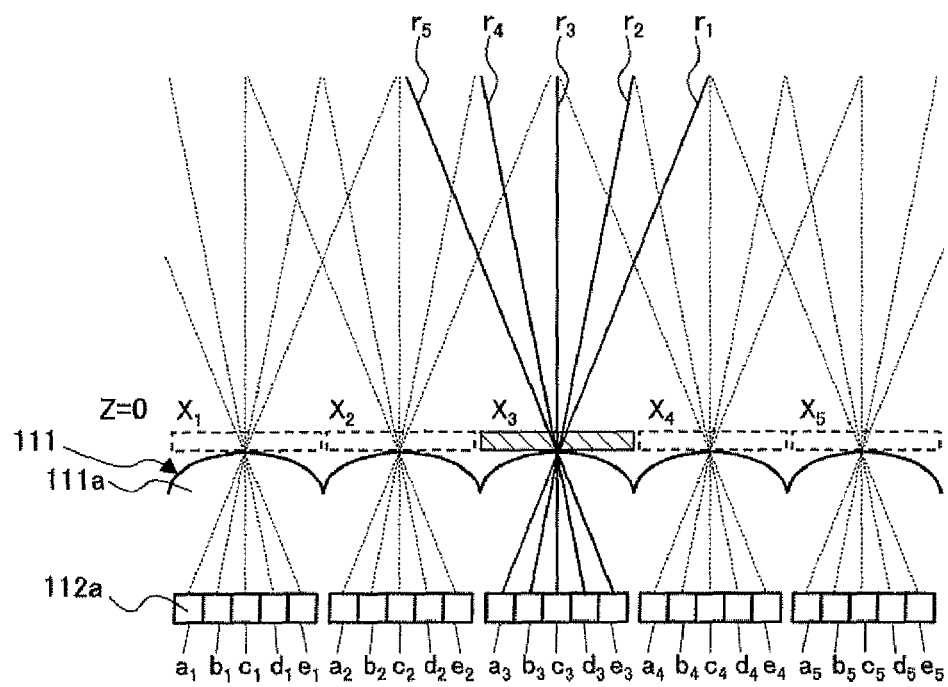
FIG. 8 is a view illustrating an example of a method of image synthesis when an image plane corresponding to a position where a subject exists is located at a certain plane (Z=0)
Figure 9:
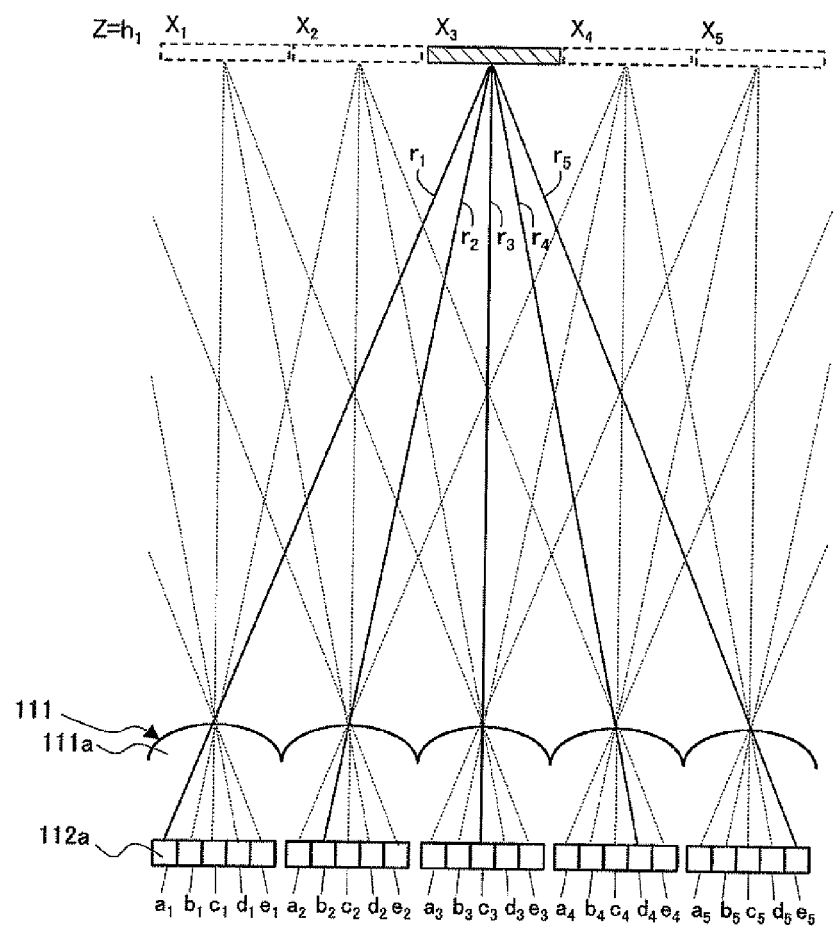
FIG. 9 is a view illustrating an example of a method of image synthesis when an image plane corresponding to a position where a subject exists is located at another certain plane ($Z=h_1$)
Figure 10:
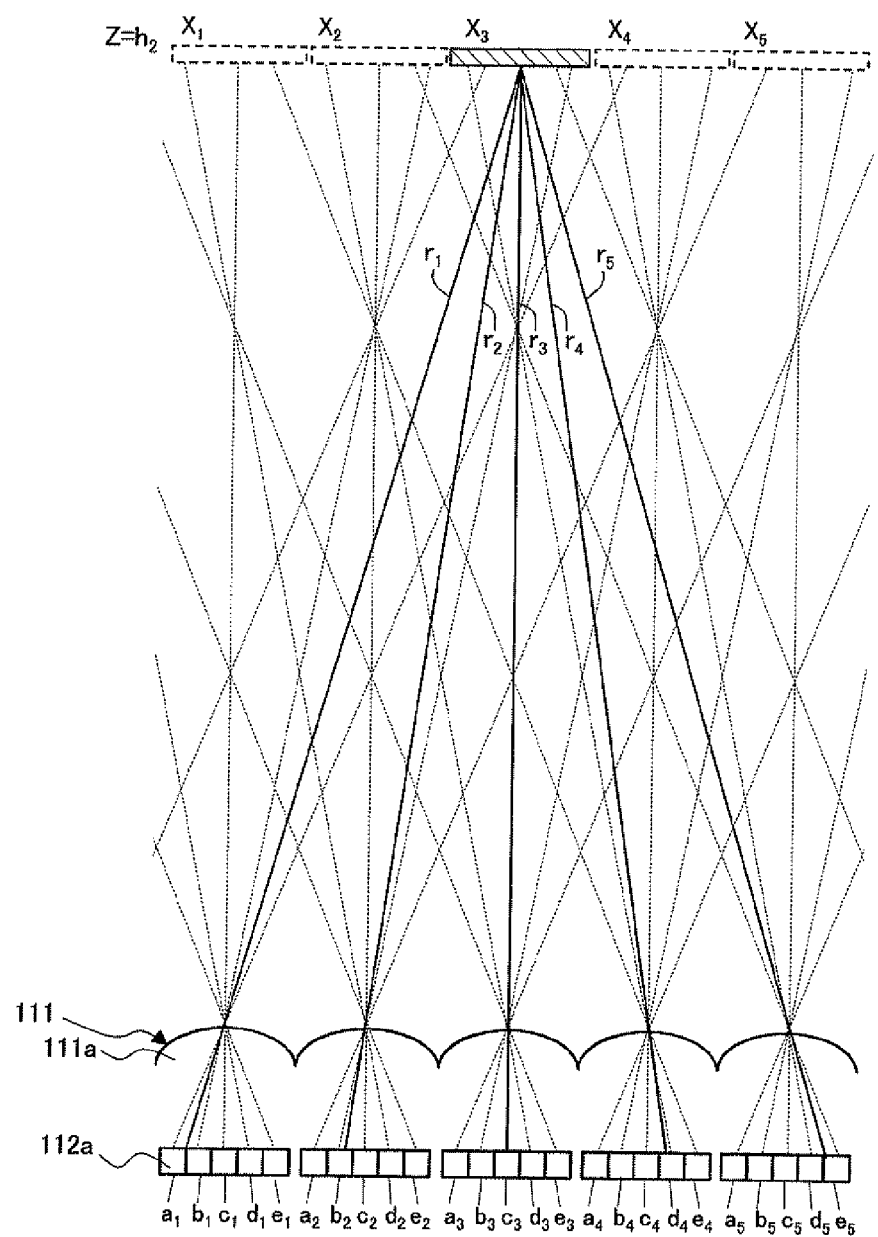
FIG. 10 is a view illustrating an example of a method of image synthesis when an image plane corresponding to a position where a subject exists is located at a still another certain plane ($Z=h_2$)

In step S11, the camera controller 160 reads out the light receiving signal obtained by the image pickup device 110 in step S9 from the memory 170, and performs an image synthesis based on the read out signal and the data of the defocus amounts df at the plurality of positions respectively depending on the focus detecting areas AFP calculated in the defocus calculator 152, thereby producing a synthetic image in focus for each of a plurality of subjects in a shooting screen. Hereinafter, the method of image synthesis according to the present embodiment will be described with reference to FIGS. 8 to 10. FIGS. 8 to 10 are views each illustrating an example of the method of image synthesis according to the present embodiment.

Described at first hereinafter is the case, as shown in FIG. 8, where a subject intended to be image-synthesized is present at a position of Z=0 provided that the height of image plane from the micro lens array 111 (or distance from the micro lens array 111) is given by Z. Illustrated in FIG. 8 is each light ray (only principal light ray passing through the center of each micro lens 111a forming the micro lens array 111) incident to each of five photoelectric conversion elements 112a out of the photoelectric conversion elements 112a forming each photoelectric conversion element array 112. In order for each photoelectric conversion element 112a to be identified in FIG. 8, respective photoelectric conversion elements 112a are indicated by $a_1$ to $e_1$, $a_2$ to $e_2$, $a_3$ to $e_3$, $a_4$ to $e_4$, and $a_5$ to $e_5$, and out of respective coordinates $X_1$, $X_2$, $X_3$, $X_4$, and $X_5$ at the height of image plane Z=0, exit light beams from $X_3$ (light rays $r_1$, $r_2$, $r_3$, $r_4$, and $r_5$) are indicated by solid lines, and other exit light beams from $X_1$, $X_2$, $X_4$, and $X_5$ are indicated by dotted lines (hereinafter similar in FIGS. 9 and 10).

As shown in FIG. 8, exit light beams (light rays $r_1$, $r_2$, $r_3$, $r_4$, and $r_5$) from the coordinate $X_3$ at the height of image plane Z=0 are incident respectively to the photoelectric conversion elements $a_3$, $b_3$, $c_3$, $d_3$, and $e_3$. Therefore, there may be obtained a pixel value $L(Z=0, X_3)$ at the height of image plane Z=0 and the coordinate $X_3$ by combining outputs from these photoelectric conversion elements $a_3$, $b_3$, $c_3$, $d_3$, and $e_3$ (refer to the following equation (1)).

$$L(Z=0,X_3)=\text{Out}(a_3)+\text{Out}(b_3)+\text{Out}(c_3)+\text{Out}(d_3)+\text{Out}(e_3) \quad (1)$$

There may also be obtained a pixel value $L(Z=0, X_4)$ at the coordinate $X_4$ adjacent to the coordinate $X_3$ in accordance with the following equation (2).

$$L(Z=0,X_4)=\text{Out}(a_4)+\text{Out}(b_4)+\text{Out}(c_4)+\text{Out}(d_4)+\text{Out}(e_4) \quad (2)$$

Accordingly, there may be arbitrarily obtained a pixel value $L(Z=0, X_i)$ at a given coordinate $X_i$ in accordance with the following equation (3).

$$L(Z=0,X_i)=\text{Out}(a_i)+\text{Out}(b_i)+\text{Out}(c_i)+\text{Out}(d_i)+\text{Out}(e_i) \quad (3)$$

It is to be noted that the above equation (3) may be employed when the designated aperture value by a user is an open value (maximum aperture size). If the designated aperture value by a user is maximum (minimum aperture size), then the following equation (4) may be employed in place of the above equation (3) because it is enough that the light beams comprising light rays $r_1$, $r_2$, $r_3$, $r_4$, and $r_5$ are restricted to the light beam consisting only of light ray $r_3$ (similar in FIGS. 9 and 10 to be described later).

$$L(Z=0,X_i)=\text{Out}(c_i) \quad (4)$$

Also, if the designated aperture value by a user is an intermediate value (aperture size being intermediate between the maximum and the minimum thereof), then the following equation (5) may be employed in place of the above equation (3) because it is enough that the light beams comprising light rays $r_1$, $r_2$, $r_3$, $r_4$, and $r_5$ are restricted to the light beams consisting only of light rays $r_2$, $r_3$, and $r_4$ (similar in FIGS. 9 and 10 to be described later).

$$L(Z=0,X_i)=\text{Out}(b_i)+\text{Out}(c_i)+\text{Out}(d_i) \quad (5)$$

Although the above description takes particular note for five photoelectric conversion elements $a_3$, $b_3$, $c_3$, $d_3$, and $e_3$ arranged in a certain direction and output values thereof are added together, it should be required actually that outputs from 25 photoelectric conversion elements arranged in two dimensions are added together (similar in FIGS. 9 and 10 to be described later).

Described next hereinafter is the case, as shown in FIG. 9, that a subject intended to be image-synthesized is present at a position of the height of image plane Z=$h_1$. As shown in FIG. 9, different from the case of FIG. 8, exit light beams (light rays $r_1$, $r_2$, $r_3$, $r_4$, and $r_5$) from the coordinate $X_3$ at the height of image plane Z=$h_1$ are incident respectively to the photoelectric conversion elements $a_1$, $b_2$, $c_3$, $d_4$, and $e_5$. Therefore, there may be obtained a pixel value $L(Z=h_1, X_3)$ at the height of image plane Z=$h_1$ and the coordinate $X_3$ by combining outputs from these photoelectric conversion elements $a_1$, $b_2$, $c_3$, $d_4$, and $e_5$ (refer to the following equation (6)).

$$L(Z=h_1,X_3)=\text{Out}(a_1)+\text{Out}(b_2)+\text{Out}(c_3)+\text{Out}(d_4)+\text{Out}(e_5) \quad (6)$$

Then, described hereinafter is the case, as shown in FIG. 10, that a subject intended to be image-synthesized is present at a position of the height of image plane Z=$h_2$. As shown in FIG. 10, different from the cases of FIGS. 8 and 9, exit light beams (light rays $r_1$, $r_2$, $r_3$, $r_4$, and $r_5$) from the coordinate $X_3$ at the height of image plane Z=$h_2$ are incident across to a plurality of the photoelectric conversion elements. More specifically, as shown in FIG. 10, light rays $r_1$ is incident across to the photoelectric conversion elements $a_1$ and $b_1$, light rays $r_2$ is incident across to the photoelectric conversion elements $b_2$ and $c_2$, light rays $r_4$ is incident across to the photoelectric conversion elements $c_4$ and $d_4$, and light rays $r_5$ is incident across to the photoelectric conversion elements $d_5$ and $e_5$. Herein, light ray $r_3$ is incident only to the photoelectric conversion element $c_3$ as shown in FIG. 10. Thus, regarding the right ray $r_1$, a light quantity of the right ray $r_1$ may be obtained on the basis of the weighted sum of an output value $\text{Out}(a_1)$ from the photoelectric conversion element $a_1$ and an output value $\text{Out}(b_1)$ from the photoelectric conversion element $b_1$ (refer to the following expression (7)). In the expression (7), $w_{11}$ and $w_{12}$ represent weighting coefficients to be determined depending on the height Z of image plane from the micro lens array 111.

$$\text{Out}(a_1) \times w_{11} + \text{Out}(b_1) \times w_{12} \quad (7)$$

Similarly, light quantities of the light rays $r_2$, $r_4$, and $r_5$ can be obtained on the basis of the weighted sum thereof. Therefore, there can be obtained a pixel value $L(Z=h_2, X_3)$ at the height of image plane Z=$h_2$ and the coordinate $X_3$ in accordance with the following equation (8). In the equation (8), $w_{21}$, $w_{22}$, $w_{41}$, $w_{42}$, $w_{51}$, and $w_{52}$ represent weighting coefficients to be determined depending on the height Z of image plane from the micro lens array 111.

$$L(Z=h_2,X_3)=[\text{Out}(a_1) \times w_{11}+\text{Out}(b_1) \times w_{12}]+[\text{Out}(b_2) \times w_{21}+\text{Out}(c_2) \times w_{22}]+\text{Out}(c_3)+[\text{Out}(c_4) \times w_{41}+\text{Out}(d_4) \times w_{42}]+[\text{Out}(d_5) \times w_{51}+\text{Out}(e_5) \times w_{52}] \quad (8)$$

As described above, according to the present embodiment, the position Z of image plane where a subject intended to be image-synthesized is present becomes to determine the photoelectric conversion elements 112a to which the light beam from the subject is incident and the values of the weighting coefficients required for the image synthesis. In addition, the position Z of image plane where a subject intended to be image-synthesized is present can be obtained in accordance with the defocus amounts df at the plurality of positions respectively depending on the focus detecting areas AFP calculated in the defocus calculator 152. Therefore, according to the present embodiment, the light receiving signals obtained by the image pickup device 110 can be synthesized based on the data of the defocus amounts df at the plurality of positions, thereby producing a synthetic image in focus for each of a plurality of subjects in a shooting screen. Thus obtained synthetic image is stored into the memory 170.

It is to be noted that the information regarding the photoelectric conversion elements 112a to which the light beam from a subject is incident and the values of the weighting coefficients required for the image synthesis may be available for each image plane position Z by providing a structure in which such information has been preliminarily stored in a nonvolatile memory provided with the camera controller 160.

On the other hand, in step S12, the light receiving signal obtained by the image pickup device 110 in step S9 is stored into the memory 170 together with the defocus amounts df relevant to the focus detecting areas AFP calculated by the defocus calculator 152 without performing the image synthesis because the determination not to synthesize a image has been already obtained in step S10.

According to the present embodiment, the image synthesis range is set based on the effective diameter of the micro lens and the size of the photoelectric conversion element 112*a*, next the lens position of the focus lens 212 is determined in accordance with the above image synthesis range and the distribution of defocus amounts df at the plurality of positions respectively depending on the focus detecting areas AFP such that the most positions of the image plane corresponding to each focus detecting area AFP are present within the above image synthesis range, then the focus lens 212 is driven to the determined lens position, and the shooting of a subject is performed. Therefore, according to the present embodiment, when a plurality of subjects with different distances are present, it is enabled to designate as many subjects as possible to be image-synthesized in focuses based on a signal obtained through one time shooting.

Note that the embodiment explained above was described for facilitating the understanding of the present invention and was not described for limiting the present invention. Therefore, the elements disclosed in the embodiment include all design changes and equivalents falling under the technical scope of the present invention.

Figure 11A:
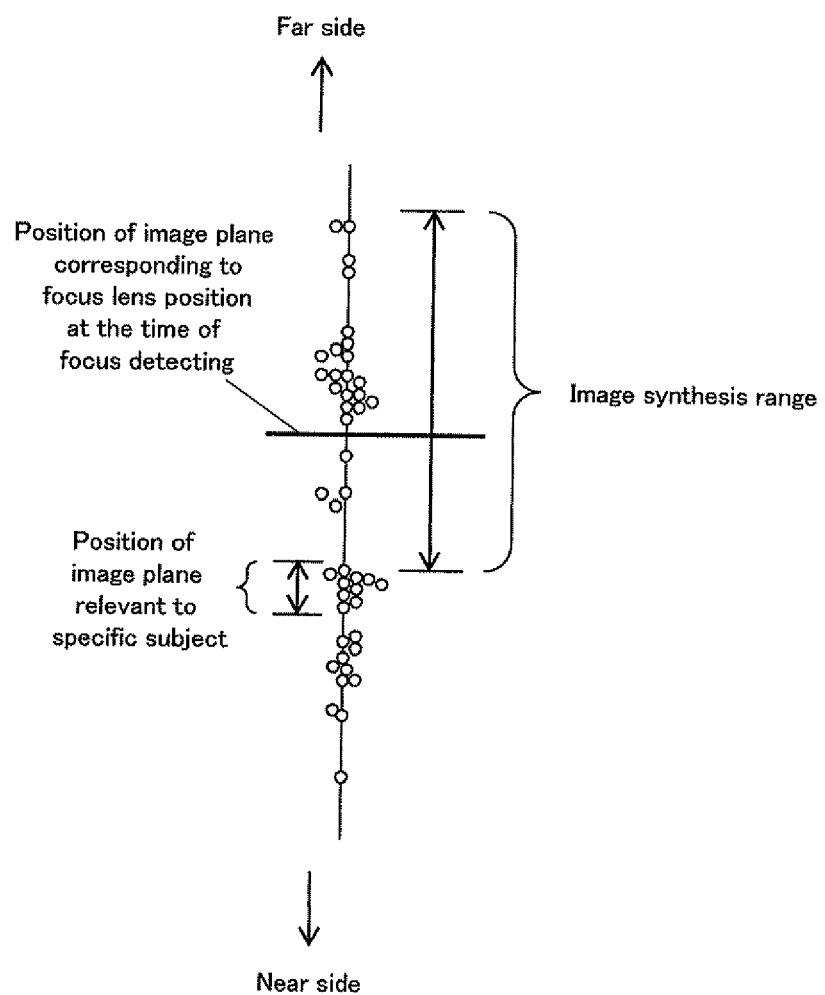
FIGS. 11A and 11B are views for explaining a method of determining a lens position of the focus lens 212 according to another embodiment.
Figure 11B:
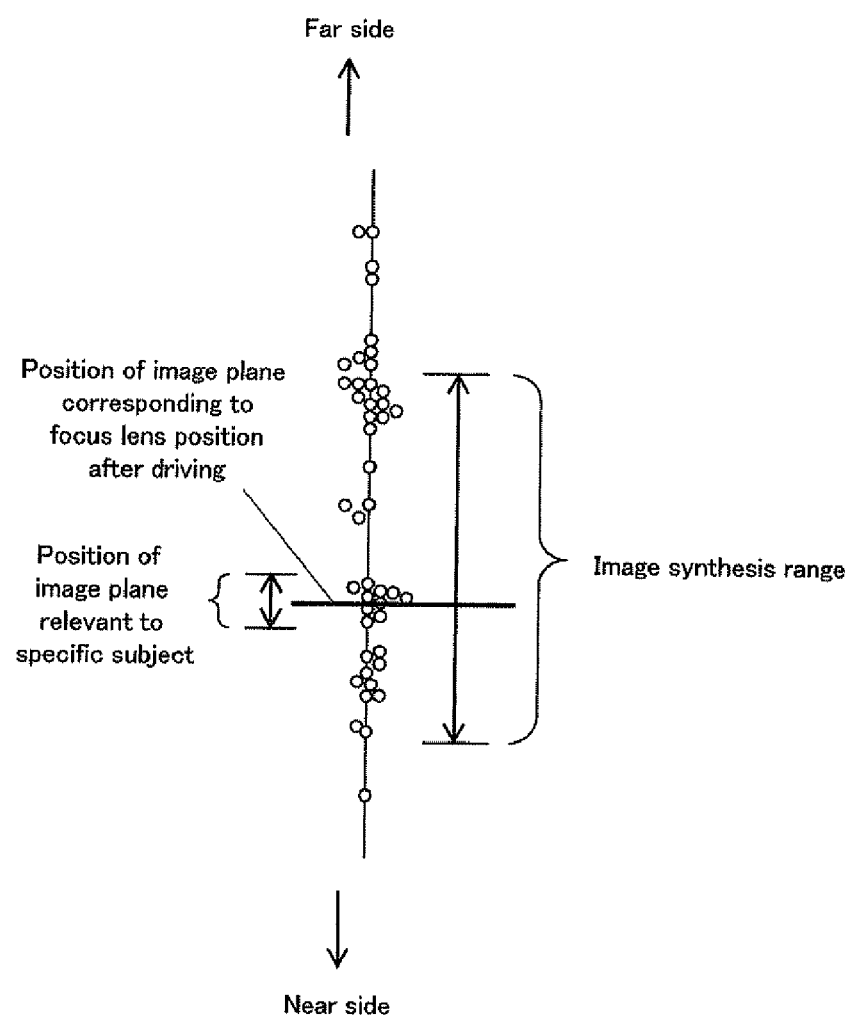

For example, at the time of calculating the defocus amounts df at the plurality of positions respectively depending on the focus detecting areas AFP as shown in FIG. 4, a recognition process for a specific subject such as human face may be employed. More specifically, there may be provided a structure which operates such that, when the position of image plane for the specific subject is obtained as shown in FIG. 11A, the position of the focus lens 212 is moved to the position of image plane for the specific subject as shown in FIG. 11B. Herein, FIGS. 11A and 11B are views for explaining a method of determining the lens position of the focus lens 212 according to another embodiment.

Moreover, although the exemplified herewith is the structure performing the detection and the calculation of the defocus amounts df at the plurality of positions respectively depending on the focus detecting areas AFP as shown in FIG. 4 by using the signal from each photoelectric conversion element 112*a* forming the image pickup device 110, there may be employed a structure provided with a focus detecting device having a sensor for focus detecting separated from the image pickup device 110. Examples thereof include a structure having a total reflecting mirror provided behind the quick return mirror 120 and extracting a part of light beam from the shooting optical system by reflection at the total reflecting mirror, thereby introducing the extracted light beam to the focus detecting device.

What is claimed is:

1. An imaging apparatus comprising:
a light receiving element having a micro lens array provided with a plurality of micro lenses arranged two-dimensionally, and a plurality of photoelectric conversion elements provided for the plurality of micro lenses, and outputting a light receiving signal obtained by receiving a light beam from an optical system via the micro lens array;
a detector that detects shift amounts of an image plane by the optical system respectively for a plurality of focus detecting positions set at a plurality of positions in the image plane by the optical system;
a controller that determines a focus adjusting position for the optical system based on a plurality of the shift amounts detected respectively for the plurality of focus detecting positions and a range of the image plane where an image based on the light receiving signal is enabled to be produced, and obtains the light receiving signal at the focus adjusting position with the light receiving element; and
a synthesizer that synthesizes an image at a specific image plane by the optical system based on the light receiving signal.

2. The imaging apparatus according to claim 1, wherein the controller determines the focus adjusting position such that the range of the image plane where the image is enabled to be produced includes the shift amounts.

3. The imaging apparatus according to claim 1, wherein the detector detects the shift amounts of the image plane by the optical system based on the light receiving signal.

4. An imaging apparatus comprising:
a light receiving element having a micro lens array provided with a plurality of micro lenses arranged two-dimensionally, and a plurality of photoelectric conversion elements provided for the plurality of micro lenses, and outputting a light receiving signal obtained by receiving a light beam from an optical system via the micro lens array;
a detector that detects shift amounts of an image plane by the optical system respectively for a plurality of focus detecting positions set at a plurality of positions in the image plane by the optical system;
a controller that determines a focus adjusting position for the optical system based on a plurality of the shift amounts detected respectively for the plurality of focus detecting positions and a range of the image plane where an image based on the light receiving signal is enabled to be produced, and obtains the light receiving signal at the focus adjusting position with the light receiving element; and
a memory that memorizes the shift amounts together with the light receiving signal relevant thereto.

5. The imaging apparatus according to claim 4, wherein the controller determines the focus adjusting position such that the range of the image plane where the image is enabled to be produced includes the shift amounts.

6. The imaging apparatus according to claim 4, wherein the detector detects the shift amounts of the image plane by the optical system based on the light receiving signal.

7. An image synthesis method comprising:
detecting shift amounts of an image plane by an optical system respectively for a plurality of focus detecting positions set at a plurality of positions in the image plane by the optical system;
determining a focus adjusting position for the optical system based on a plurality of the shift amounts detected respectively for the plurality of focus detecting positions and a range of the image plane where an image at a specific image plane by the optical system is enabled to be synthesized;
generating a light receiving signal by receiving a light beam from the optical system at the focus adjusting position with a plurality of photoelectric conversion elements which is provided for a micro lens array having a plurality of micro lenses arranged two-dimensionally, the light beam passing through the micro lens array; and synthesizing an image at the specific image plane by the optical system based on the light receiving signal.

8. An imaging apparatus comprising:

a light receiving element having a micro lens array provided with a plurality of micro lenses arranged two-dimensionally, and a plurality of photoelectric conversion elements provided for the plurality of micro lenses, and outputting a light receiving signal obtained by receiving a light beam from an optical system via the micro lens array;

a detector that detects shift amounts of an image plane by the optical system respectively for a plurality of focus detecting positions set at a plurality of positions in the image plane by the optical system;

a recognition device that recognizes an image of a specific subject from an image by the optical system; and a controller that determines a focus adjusting position for the optical system based on a plurality of the shift amounts detected for a focus detecting position corresponding to the image recognized by the recognition device out of the plurality of the focus detecting positions and a range of the image plane where an image based on the light receiving signal is enabled to be produced, and obtains the light receiving signal at the focus adjusting position with the light receiving element.

9. The imaging apparatus according to claim 8, wherein the controller determines the focus adjusting position such that the range of the image plane where the image is enabled to be produced includes the shift amounts.

10. An imaging apparatus according to claim 8, wherein the detector detects the shift amounts of the image plane by the optical system based on the light receiving signal.

11. An imaging apparatus comprising:

a light receiving element having a micro lens array provided with a plurality of micro lenses arranged two-dimensionally, and a plurality of photoelectric conversion elements provided for the plurality of micro lenses, and outputting a light receiving signal obtained by receiving a light beam from an optical system via the micro lens array;

a detector that detects shift amounts of an image plane by the optical system respectively for a plurality of focus detecting positions set at a plurality of positions in the image plane by the optical system; and a controller that determines a focus adjusting position for the optical system based on a plurality of the shift amounts detected respectively for the plurality of focus detecting positions and a range of the image plane where an image based on the light receiving signal is enabled to be produced, and obtains the light receiving signal at the focus adjusting position with the light receiving element, wherein the controller determines the focus adjusting position after removing a part of a distribution of the shift amounts.

12. The imaging apparatus according to claim 11, wherein the controller determines the focus adjusting position such that the range of the image plane where the image is enabled to be produced includes the shift amounts.

13. The imaging apparatus according to claim 11, wherein the detector detects the shift amounts of the image plane by the optical system based on the light receiving signal.

14. An imaging apparatus comprising:

a light receiving element having a micro lens array provided with a plurality of micro lenses arranged two-dimensionally, and a plurality of photoelectric conversion elements provided for the plurality of micro lenses, and outputting a light receiving signal obtained by receiving a light beam from an optical system via the micro lens array;

a detector that detects shift amounts of an image plane by the optical system respectively for a plurality of focus detecting positions set at a plurality of positions in the image plane by the optical system; and a controller that determines a focus adjusting position for the optical system based on a plurality of the shift amounts detected respectively for the plurality of focus detecting positions and a range of the image plane where an image based on the light receiving signal is enabled to be produced, and obtains the light receiving signal at the focus adjusting position with the light receiving element, wherein the range of the image plane where the image is enabled to be produced is determined based on an effective diameter of each of the micro lenses and a size of each of the photoelectric conversion elements.

15. The imaging apparatus according to claim 14, wherein the controller determines the focus adjusting position such that the range of the image plane where the image is enabled to be produced includes the shift amounts.

16. The imaging apparatus according to claim 14, wherein the detector detects the shift amounts of the image plane by the optical system based on the light receiving signal.

17. An imaging apparatus comprising:

a light receiving element having a micro lens array provided with a plurality of micro lenses arranged two-dimensionally, and a plurality of photoelectric conversion elements provided for the plurality of micro lenses, and outputting a light receiving signal obtained by receiving a light beam from an optical system via the micro lens array;

a detector that detects shift amounts of an image plane by the optical system respectively for a plurality of focus detecting positions set at a plurality of positions in the image plane by the optical system; and a controller that determines a focus adjusting position for the optical system based on a plurality of the shift amounts detected respectively for the plurality of focus detecting positions and a range of the image plane where an image based on the light receiving signal is enabled to be produced, and obtains the light receiving signal at the focus adjusting position with the light receiving element, wherein the controller determines the focus adjusting position after removing a certain shift amount with low reliability out of the shift amounts.

18. An imaging apparatus comprising:

a light receiving element having a micro lens array provided with a plurality of micro lenses arranged two-dimensionally, and a plurality of photoelectric conversion elements provided for the plurality of micro lenses, and outputting a light receiving signal obtained by receiving a light beam from an optical system via the micro lens array;

a detector that detects shift amounts of an image plane by the optical system respectively for a plurality of focus detecting positions set at a plurality of positions in the image plane by the optical system; and a controller that determines a focus adjusting position for the optical system based on a plurality of the shift amounts detected respectively for the plurality of focus detecting positions and a range of the image plane where an image at a specific image plane by the optical system is enabled to be synthesized based on the light receiving signal, and obtains the light receiving signal at the focus adjusting position with the light receiving element.

19. The imaging apparatus according to claim 18, wherein the controller determines the focus adjusting position such that the range of the image plane where the image is enabled to be produced includes the shift amounts.

20. The imaging apparatus according to claim 18, wherein the detector detects the shift amounts of the image plane by the optical system based on the light receiving signal.

* * * * *